US010678256B2

(12) United States Patent
Schulter et al.

(10) Patent No.: US 10,678,256 B2
(45) Date of Patent: Jun. 9, 2020

(54) GENERATING OCCLUSION-AWARE BIRD EYE VIEW REPRESENTATIONS OF COMPLEX ROAD SCENES

(71) Applicant: NEC Laboratories America, Inc., Princeton, NJ (US)

(72) Inventors: Samuel Schulter, Santa Clara, CA (US); Paul Vernaza, Sunnyvale, CA (US); Manmohan Chandraker, Santa Clara, CA (US); Menghua Zhai, Lexington, KY (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 16/145,621

(22) Filed: Sep. 28, 2018

(65) Prior Publication Data

US 2019/0096125 A1 Mar. 28, 2019

Related U.S. Application Data

(60) Provisional application No. 62/564,501, filed on Sep. 28, 2017, provisional application No. 62/585,577, filed on Nov. 14, 2017.

(51) Int. Cl.
*G05D 1/02* (2020.01)
*G05D 1/00* (2006.01)
(Continued)

(52) U.S. Cl.
CPC ......... *G05D 1/0246* (2013.01); *G05D 1/0088* (2013.01); *G06K 9/00* (2013.01);
(Continued)

(58) Field of Classification Search
None
See application file for complete search history.

(56) References Cited

U.S. PATENT DOCUMENTS

| 6,396,535 B1 * | 5/2002 | Waters | G01S 11/12 |
| | | | 348/143 |
| 10,019,637 B2 * | 7/2018 | Chen | G06T 7/248 |

(Continued)

OTHER PUBLICATIONS

Hole-Filling Method Using Depth Based In-Painting for View Synthesis in Free Viewpoint Television (FTV) and 3D Video Kwan-Jung Oh, Jun. 2009.*

(Continued)

*Primary Examiner* — Jason A Pringle-Parker
(74) *Attorney, Agent, or Firm* — Joseph Kolodka

(57) ABSTRACT

Systems and methods for generating an occlusion-aware bird's eye view map of a road scene include identifying foreground objects and background objects in an input image to extract foreground features and background features corresponding to the foreground objects and the background objects, respectively. The foreground objects are masked from the input image with a mask. Occluded objects and depths of the occluded objects are inferred by predicting semantic features and depths in masked areas of the masked image according to contextual information related to the background features visible in the masked image. The foreground objects and the background objects are mapped to a three-dimensional space according to locations of each of the foreground objects, the background objects and occluded objects using the inferred depths. A bird's eye view is generated from the three-dimensional space and displayed with a display device.

18 Claims, 9 Drawing Sheets

(51) Int. Cl.
*G06T 17/05* (2011.01)
*G06T 7/194* (2017.01)
*G06T 7/514* (2017.01)
*G06T 7/50* (2017.01)
*G06K 9/00* (2006.01)
*G06T 15/20* (2011.01)
*G06T 7/11* (2017.01)
*G06T 3/00* (2006.01)
*G06T 15/40* (2011.01)

(52) U.S. Cl.
CPC ............ *G06T 3/0093* (2013.01); *G06T 7/11* (2017.01); *G06T 7/194* (2017.01); *G06T 7/50* (2017.01); *G06T 7/514* (2017.01); *G06T 15/20* (2013.01); *G06T 15/405* (2013.01); *G06T 17/05* (2013.01); *G05D 2201/0213* (2013.01); *G06T 2207/20076* (2013.01); *G06T 2207/30236* (2013.01); *G06T 2207/30252* (2013.01)

(56) References Cited

U.S. PATENT DOCUMENTS

| | | | | |
|---|---|---|---|---|
| 10,067,509 B1* | 9/2018 | Wang | ................... | G06K 9/6271 |
| 10,176,388 B1* | 1/2019 | Ghafarianzadeh | .......................... | |
| | | | | G06K 9/00671 |
| 2008/0075367 A1* | 3/2008 | Winn | ..................... | G06K 9/342 |
| | | | | 382/180 |
| 2010/0322476 A1* | 12/2010 | Kanhere | .............. | G08G 1/0175 |
| | | | | 382/103 |
| 2012/0236122 A1* | 9/2012 | Fukawa | ................. | G08G 1/166 |
| | | | | 348/46 |
| 2013/0188869 A1* | 7/2013 | Yoo | ......................... | G06T 7/162 |
| | | | | 382/173 |
| 2013/0314503 A1* | 11/2013 | Nix | .................... | G06K 9/00805 |
| | | | | 348/46 |
| 2015/0022664 A1* | 1/2015 | Pflug | ...................... | H04N 7/181 |
| | | | | 348/148 |
| 2015/0371095 A1* | 12/2015 | Hartmann | .......... | G06K 9/00791 |
| | | | | 348/148 |
| 2016/0247290 A1* | 8/2016 | Liu | ...................... | G06K 9/4604 |

OTHER PUBLICATIONS

Geiger, "3D Traffic Scene Understanding from Movable Platforms.", IEEE Transactions on Pattern Analysis and Machine Intelligence, vol. 36, Issue 5, May 2014, pp. 1012-1025.

Liu, "Building Scene Models by Completing and Hallucinating Depth and Semantics.", Computer Vision ECCV, Sep. 2016, pp. 1-17.

Pathak, "Context Encoders: Feature Learning by Inpainting.", Proceedings of IEEE Conference on Computer Vision and Pattern Recognition, Apr. 2016, pp. 2536-2544.

Schulter, "Learning to Look Around Objects for Top-View Representations of Outdoor Scenes", ECCV, Mar. 2018, 16 pages.

Tulsiani, "Layer-Structured 3D Scene Inference via View Synthesis", ECCV, Jul. 2018, 16 pages.

* cited by examiner

GENERATING OCCLUSION-AWARE BIRD EYE VIEW REPRESENTATIONS OF COMPLEX ROAD SCENES

BACKGROUND

Technical Field

The present invention relates to generating bird eye view representations of environments and more particularly generating occlusion-aware bird eye view representations of complex road scenes.

Description of the Related Art

Mapping a three-dimensional (3D) environment can benefit a variety of activities such as, e.g., autonomous driving and other applications that use situational awareness of the environment. However, when viewing an environment from a vantage point, only a two-dimensional (2D) representation of the environment is available. Accordingly, objects may be hidden behind other objects, and relative depth from the vantage point can be difficult to determine. Simply using an image from the vantage point or creating a depth map may not be sufficient to adequately determine the relative locations of each object within the environment, making navigation in applications such as autonomous driving very difficult.

SUMMARY

According to an aspect of the present principles, a method is provided for generating an occlusion-aware bird's eye view map of a road scene. The method includes identifying foreground objects and background objects in an input image by using a semantic segmentation network to extract foreground features corresponding to the foreground objects and background features corresponding to the background objects. The foreground objects are masked from the input image with a mask. Occluded objects are inferred by predicting semantic features in masked areas of the masked image with a semantic in-painting network according to contextual information related to the identified background features visible in the masked image. Depths of the occluded objects are inferred by predicting depths in masked areas of the masked image with a depth in-painting network according to the contextual information. The foreground objects and the background objects are mapped to a three-dimensional space with a background mapping system according to locations of each of the foreground objects, the background objects and occluded object using the inferred depths. A bird's eye view is generated from the three-dimensional space and displayed with a display device.

According to another aspect of the present principles, a system is provided for generating an occlusion-aware bird's eye view map of a road scene. The system includes a semantic segmentation network that identifies foreground objects and background objects in an input image by extracting foreground features corresponding to the foreground objects and background features corresponding to the background objects. A masking network masks the foreground objects from the input image with a mask to generate a masked image. A semantic in-painting network infers occluded objects by predicting semantic features in masked areas of the masked image according to contextual information related to the identified background features visible in the masked image. A depth in-painting network infers depths of the occluded objects by predicting depths in masked areas of the masked image according to the contextual information. A background mapping system maps the foreground objects and the background objects to a three-dimensional space according to locations of each of the foreground objects, the background objects and occluded object using the inferred depths. A view converter generates a bird's eye view from the three-dimensional space. A display device displays the bird's eye view.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
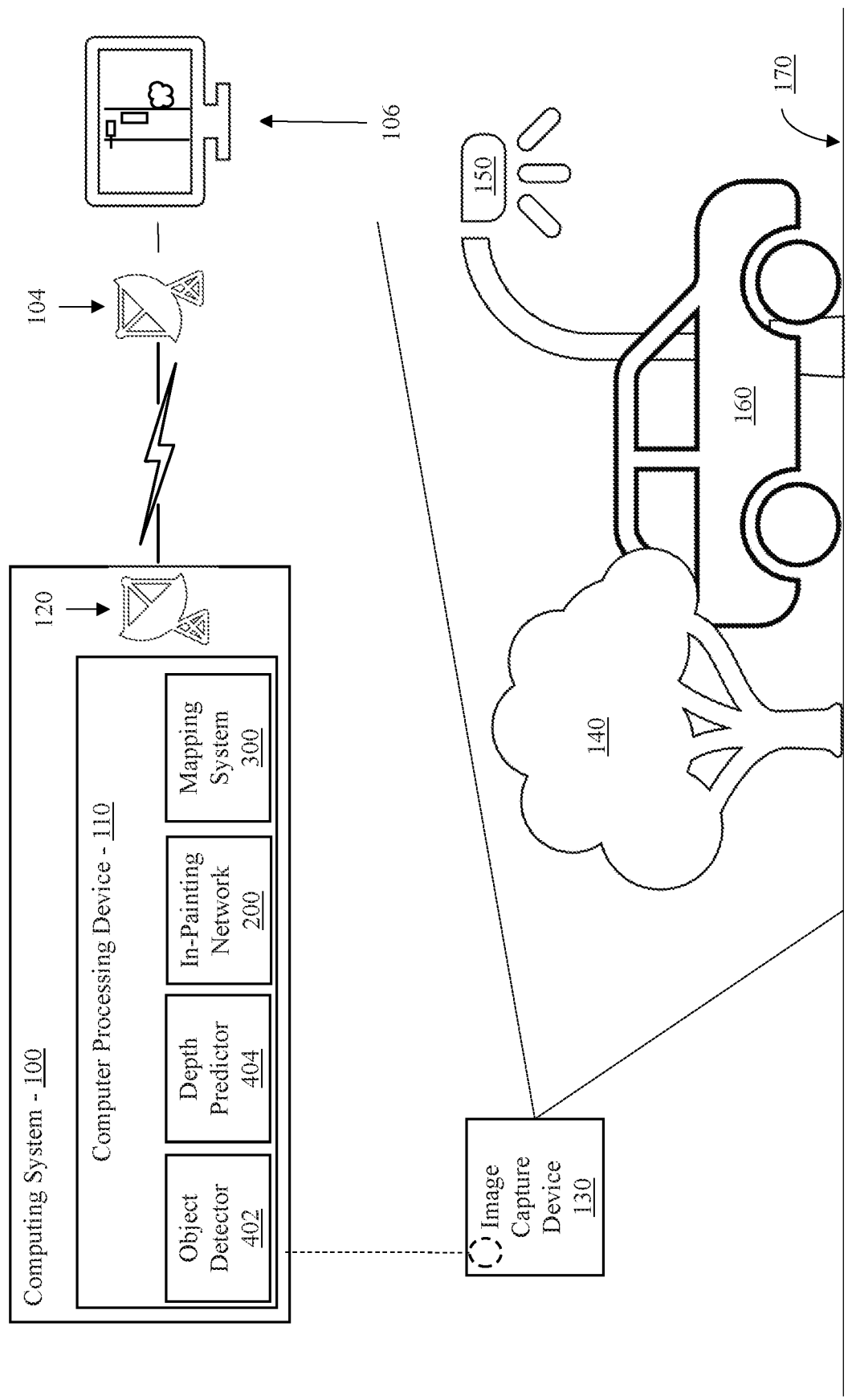
FIG. 1 is a diagram illustrating a high-level system/method for generating occlusion-aware bird eye view representations of a complex road scene, in accordance with the present principles.

In accordance with the present principles, systems and methods are provided to generate occlusion-aware bird eye view representations of a complex environment, such as, e.g., a complex road scene.

According to a possible embodiment, a single perspective image of a road scene is captured with an image capture device, such as, e.g., a camera. The image is communicated to a computing system that includes a set of networks for converting the perspective image into a bird eye view image of the environment.

To perform this conversion, a convolutional neural network (CNN) is used to identify objects in the foreground of the road scene by, e.g., semantic segmentation. The foreground objects can include, e.g., traffic participants such as cars, pedestrians, traffic signs, poles, cyclists, vegetation, and any other objects relevant to navigating the road.

The foreground objects are then masked from the scene to form blank areas constituting occlusions within the perspective image. These occlusions can then be filled in with in-painting using occlusion reasoning. For example, background objects can be recognized by, e.g., semantic segmentation performed by a CNN. Portions of the background objects that are cut off or otherwise occluded by the blank spot are filled in by inferring the missing portions of the background objects due to the occlusion using a neural network for completing partial images of objects.

Each background object can be assigned a depth using, e.g., point clouds or stereoscopic vision. Using the inferred perspective image with depths assigned to each background object, coordinates for each background object are determined and mapped in three-dimensions (3D). The 3D map can be represented in bird eye view. The recognized foreground objects can similarly be assigned depths. Thus, the foreground objects can be mapped to 3D using the depth coordinates. The mapped foreground objects can then be inserted in the bird eye view to complete the bird eye view image with both foreground and background objects.

To refine the bird eye view and reduce error, one or both of a simulator and existing street maps can be compared with the bird eye view. In particular, the simulator is implemented to represent different types, e.g., of roads, intersection, lanes and sidewalks, among other roadway features to represent the roadway features in a second bird eye view. The features can then be compared with similar features appearing in the bird eye view to refine the representation of the features in the bird eye view. Similarly, the existing map data can be compared with the bird eye view by establishing the actual location of the road scene. Comparing the existing map corresponding to the location, the existing map can refine the representation, including, e.g., locations and shapes of features, to ensure greater accuracy.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level system/method for generating occlusion-aware bird eye view representations of a complex road scene is depicted according to an embodiment of the present invention.

According to aspects of the present invention, an embodiment can include an image capture device 130 to capturing images with a perspective view of a complex environment, such as, e.g., a complex road scene. The road scene can include a variety of foreground objects, such as, e.g., a tree 140, a vehicle 160, a street lamp 150, among others, including traffic signs, pedestrians, cyclists, animals, vegetation, etc. The road scene can also include background objects, such as, e.g., a road 170, among others including, e.g., landscape features, buildings, etc.

An image from the image capture device 130 can be analyzed by a computing system 100 to provide a historical or real-time bird's eye view map of the road scene to a user. To provide such a map, the computer system 100 receives the perspective view image and infers objects occluded by the foreground objects. By inferring the occluded objects, the computing system 100 can localize both foreground and background objects with a high degree of fidelity.

Accordingly, at least one embodiment of the computing system 100 includes a computer processing device 100 with an object detector 402. The object detector 402 access the image and detects foreground objects such as, e.g., the tree, 140, the car 160 and the street lamp 150. To detect the foreground objects, the object detector 402 includes a neural network, such as, e.g., a convolutional neural network or pyramid scene parsing (PSP) network, that performs semantic segmentation on the image.

Concurrently with the object detector 402, a depth predictor 404 included with the computer processing device 110 determines depth measurements for each foreground object. To determine the depth measurements, the depth predictor 404 can establish a depth map according to, e.g., a stereoscopic image, a neural network for predicting depths such as, e.g., a fully convolutional residual network, or other depth determination technique. The depth map can be applied to the foreground objects extracted by the object detector 402 to determine 3D dimensional coordinates for each foreground object.

The computer processing device 110 can also include an in-painting network 200 for identifying background objects and inferring portions of the background objects occluded by the foreground objects. According to aspects of the present invention, the in-painting network 200 can recognize background objects using, e.g., a convolutional neural network, PSP, or other semantic segmentation technique to extract features corresponding to the background objects. However, foreground objects may occlude portions of the background objects from the perspective of the image capture device 130. To identify objects behind the occluding foreground objects, the in-painting network 200 can, e.g., mask the foreground objects from the image. Using the remaining image including the background objects, the masked portions can be replaced with inferences as to objects behind the occluding foreground objects. Thus, the in-painting network 200 can reason the shape of the recognized background objects using contextual information to infer the occluded portions and in-paint into the masked portions of the image. In-painting can include both assigning class probabilities to each pixel corresponding to background objects, as well as assigning depth value predictions. Thus, the in-painting network 200 completes the masked image by filling in the masked portions of the image with appropriate background objects.

Because the in-painting network 200 establishes both features and depth values, similar to the depth predictor 404, a mapping system 300 including, e.g., a background mapping system, can establish coordinates for each background object to localize the background objects in 3D space, such as, e.g., by generating a 3D point cloud. The 3D point cloud can be converted to a bird's eye view by eliminating an elevation component form the 3D point cloud, projecting the points onto a horizontal plane. Thus, a 2D, top-down map of the background objects is created.

Aspects of the present invention include refining the bird's eye view generated by the mapping system 300 leveraging, e.g., street maps such as, e.g., OpenStreet Map data, or by simulating road shapes, among other refining techniques to ensure that road locations and shapes are correct within the bird's eye view.

The computer processing device 110 can combine the bird's eye view of the foreground objects with the bird's eye view of the background object to generate a final bird's eye view of the complex road scene. This bird's eye view of the road scene can be communicated to a transmitter 120 for communication to a user. Additionally, the bird's eye view may be stored in a storage device or memory device of the computing system 100 for later retrieval.

A signal produced by the transmitter 120 including the bird's eye view of the road scene can be received by a receiver 104 in communication with a display device 106. The display device 106 can display the bird's eye view to a user for use as, e.g., a navigational map, a map to study traffic, pedestrian or animal patterns, or for any other suitable use. While the transmitter 120 and the receiver 104 are depicted as communicating wirelessly, the transmitter 120 and the receiver 104 can alternatively communicate via a wired connection. Indeed, the receiver 104 and the transceiver 120 can be co-located or located in the same device. For example, the transmitter 120 can be a part of a bus in the computer system 100 connected to the display 106, which receives signals with the receiver 104 including an input/output (I/O) interface.

Figure 2:
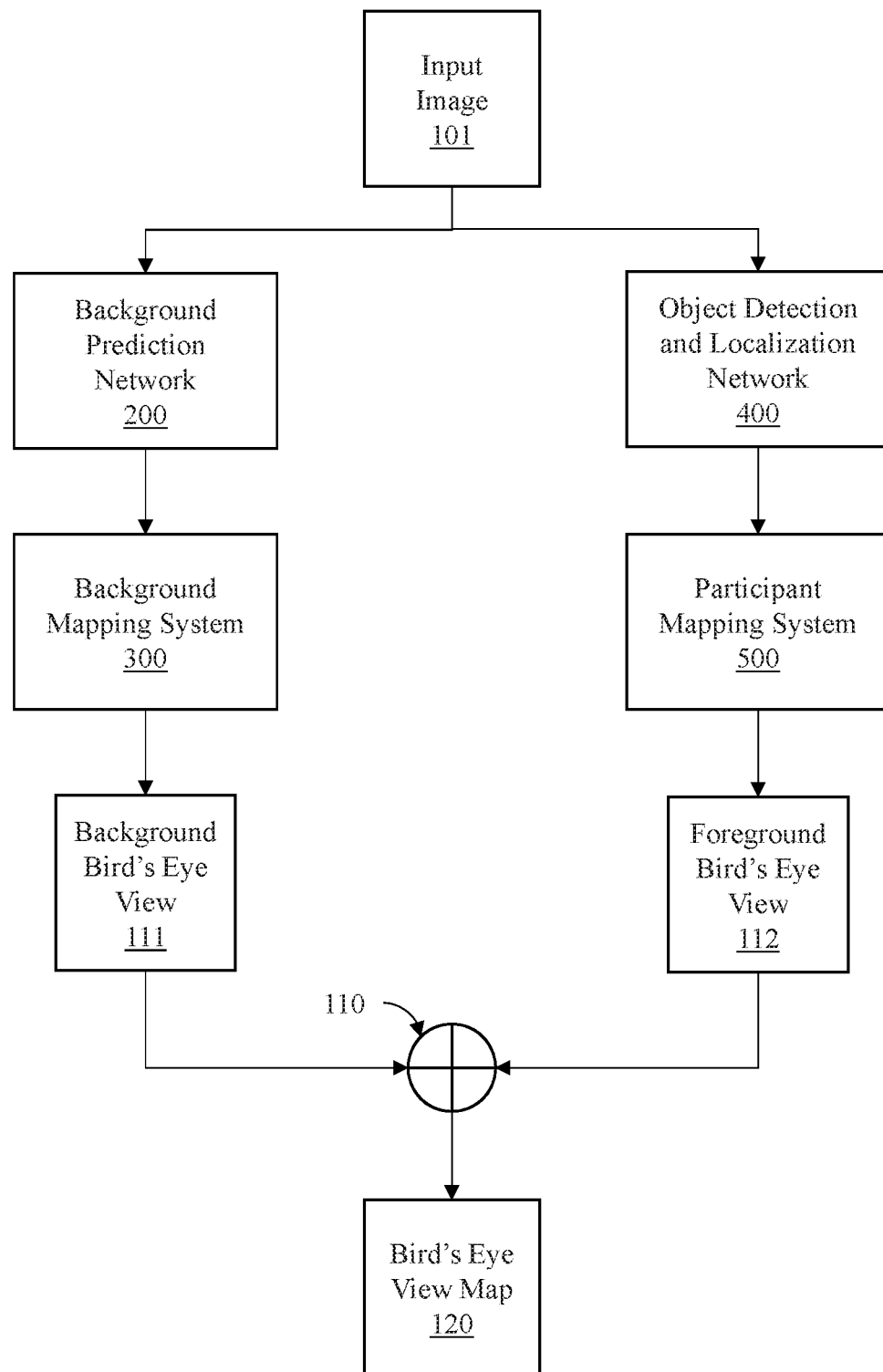
FIG. 2 is a block/flow diagram illustrating a system/method for generating a bird's eye view from an input image, in accordance with the present principles.

Referring now to FIG. 2, a system/method for generating a bird's eye view from an input image is depicted according to an embodiment of the present invention.

According to an embodiment of the present invention, an input image 101 is concurrently provided to both a background prediction network 200 and an object detection and localization network 400 in order to generate a bird's eye view map 120 of an environment, such as, e.g., a complex road scene, among other environments. To do so, the background prediction network 200 predicts background objects and depths of background objects. A background mapping system 300 maps the background objects to a background bird's eye view 111. Similarly, the object detection and localization network 400 predicts foreground objects and depths of foreground objects. A participant mapping system 500 can map the foreground objects using the depths of the foreground objects to a foreground bird's eye view 112. The background bird's eye view 111 and the foreground bird's eye view 112 are fused at a combiner 110 to generate a bird's eye view map 120 of the environment.

To predict background objects, the background prediction network 200 can, e.g., semantically segment the input image 101 to extract features associated with background object classes, such as, e.g., landscape features, roads, intersections, buildings, etc. The background prediction network 200 can include, e.g., a PSP to extract the background features, thus identifying background objects. The background prediction network 200 can use, e.g., an additional decoder or network to also extract depths corresponding to the background features. As a result, the background prediction network 200 can identify background objects as well as the distance of the background objects from the capture point of the input image 101.

However, foreground objects can occlude background objects in portions of the input image 101. Therefore, the background prediction network 200 can, e.g., mask the foreground objects, such as, e.g., people, vehicles, cyclists, animals, road signs, vegetation, etc. Thus, a mask is generated to remove the foreground objects from the input image 101. The background prediction network 200 can infer the background objects that are present in the masked portions of the input image corresponding to occluded background objects. The background prediction network 200 can infer these occluded background objects by using, e.g., a neural network for in-painting behind the masked portions according to the context of the input image 101. Thus, the background prediction network 200 can infer both objects and depths of objects behind occluding foreground objects.

A background mapping system 300 can use the identified and inferred background objects and the corresponding identified and inferred depths to map locations of the background object in the environment. For example, coordinates of the background objects within the input image 101 can be combined with corresponding depth values to generate a 3D point cloud of pixels of the background objects. The point cloud can then be flattened to a 2D map corresponding to a top down view of the environment by removing a height or elevation component from the points in the point cloud. Thus, the background bird's eye view 111 is generated from the point cloud.

The object detection and localization network 400 can perform similar functions to identify foreground objects and depths of foreground objects. In particular, the object detection and localization network 400 can, e.g., include a CNN or PSP to semantically segment the input image 101 to extract features corresponding to foreground object classes. Additionally, the object detection and localization network 400 can, e.g., extract depths of the foreground objects using a neural network. Thus, the object detection and localization network 400 can identify foreground objects and depths of foreground objects from the input image 101.

Using the identified foreground objects and the corresponding depths, the participant mapping system 500 can locate the foreground objects according to position within the input image 101 and depth from the point of capture of the input image 101. The coordinates are used to generate a 3D point cloud of the foreground objects. The point cloud can be flattened into a 2D representation mapping the foreground objects within the environment by removing a height or elevation component of the coordinates of each point in the point cloud, thus projecting the point cloud onto a 2D foreground bird's eye view 112.

To generate a complete bird's eye view map 120 of the environment, the foreground bird's eye view 112 and the background bird's eye view 111 can be fused at a combiner 110. Fusing the background bird's eye view 111 and the foreground bird's eye view 112 can include overlaying the foreground objects in the foreground bird's eye view 112 over the background bird's eye view 111. Since the background bird's eye view 111 and the foreground bird's eye view 112 are in the same metric space, the foreground bird's eye view 112 can be overlaid on top of the background bird's eye view 111 to form a single image.

Figure 3:
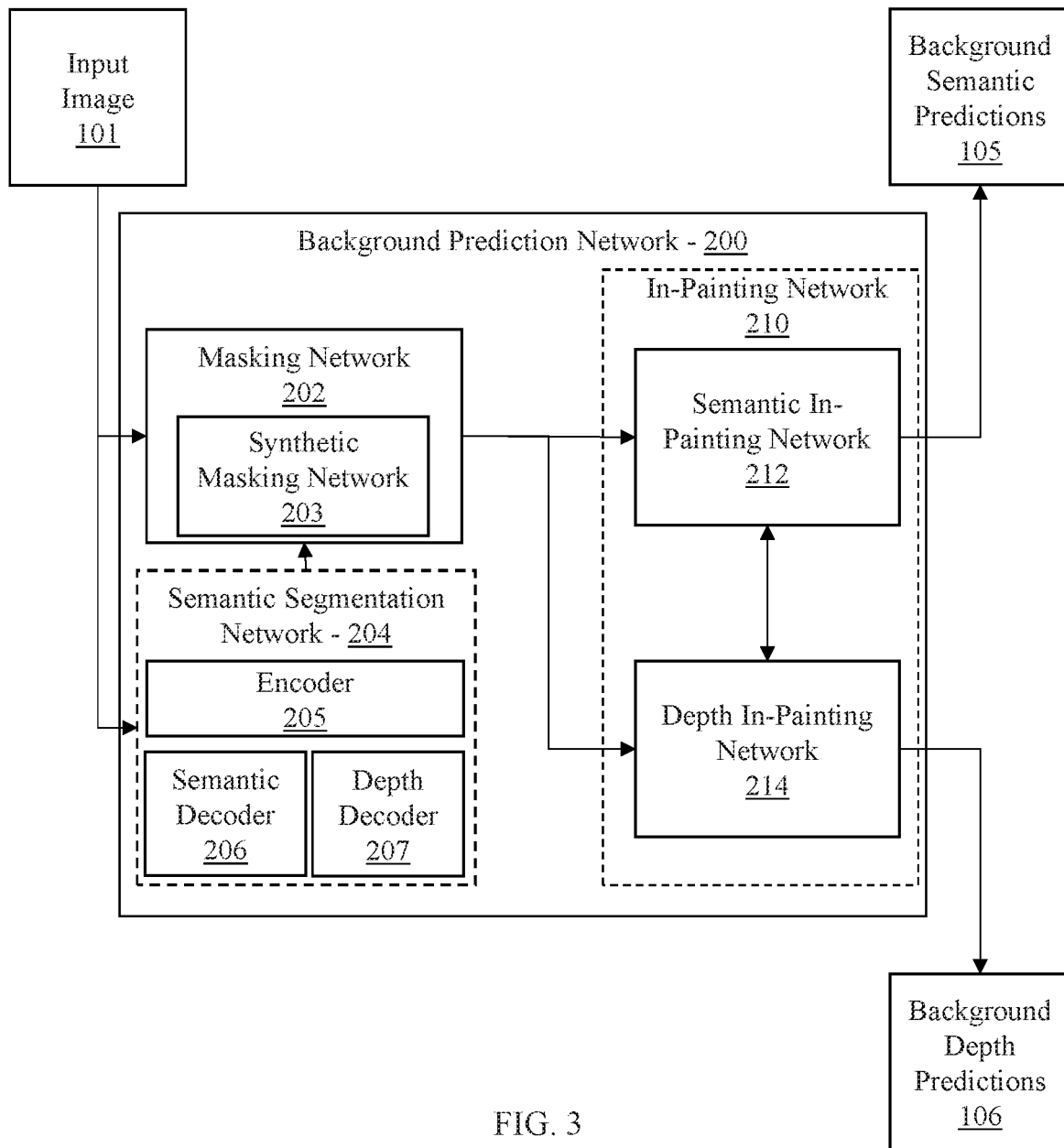
FIG. 3 is a block/flow diagram illustrating a network for recognizing background objects, in accordance with the present principles.

Referring now to FIG. 3, a network for recognizing background objects is depicted according to an embodiment of the present invention.

A background prediction network 200 of at least one embodiment of the present invention generates background semantic predictions 105 and background depth predictions 106 from an input image 101. The background prediction network 200 uses a masking network 202 to mask from the input image 101 objects occluding background objects identified by a semantic segmentation network 204. The masked input image can then be processed with an in-painting network 210. The in-painting network 210 includes a semantic in-painting network 212 to predict semantic features corresponding to the occluded background objects in the masked input image, and a depth in-painting network 214 to predict depths of background objects in the occluded areas.

In particular, the semantic segmentation network 204 jointly predicts semantic features and depths corresponding to the features. Because extracting depth predictions and extracting semantic predictions are closely related with common tasks, the depths predictions and semantic predictions can be jointly extracted with a common encoder 205, thus reducing computation complexity and increasing efficiency. The encoder 205 can include, e.g., a residual network such as, e.g., ResNet-50, or a fully convolutional residual network, among others. To maintain the special resolution of the input image 101, the encoder 205 can include, e.g., dilated convolutional filters, for example, three dilated convolutional layers, rather than strided convolution layers. Thus, the encoder 205 extracts features from the input image 101.

The features can be provided to a semantic decoder 206 and depth decoder 207 to predict semantic features and depths respectively. Thus, the semantic decoder 206 can include, e.g., a PSP to semantically segments the input image 101 to extract features corresponding to classes of objects. The classes of objects can be a predefined list of classes of objects, such as the background objects and foreground objects described above. Thus, semantic decoder 206 assigns class probabilities to each pixel that corresponds to an object depicted with each pixel.

The depth decoder 207 can include, e.g., a decoder for a fully convolutional residual network, to extract depth predictions at each pixel. The decoder segments the input image 101 by assigning each pixel a depth probability corresponding to a prediction of depths of features represented with each pixel.

The semantic decoder 206 and the depth decoder 207 can form predictions concurrently on separate copies of the features, or the semantic decoder 206 and the depth decoder 207 can be arranged serially to first predict semantic features and then predict depths, or vice versa. If the semantic decoder 206 and the depth decoder 207 operate in parallel, the resulting depth predictions and semantic predictions can be combined on a pixel-by-pixel basis such that each pixel includes class probabilities as well as depth probabilities to form a combined depth and object feature map. Because dilated convolutional layers are used, the combined feature map can be at full resolution relative to the input image 101.

The combined feature map includes both background objects and foreground objects. However, the foreground objects may occlude view of portions of the background objects in some areas of the input image 101. Thus, a masking network 202 analyzes the input image 101 and the semantic and depth feature map to determine pixels in the input image 101 assigned to a prediction for a foreground object class. Where a pixel is assigned to a foreground object class, the masking network masks the pixel by generating a mask at the pixel. The masking network 202 checks each pixel in the input image 101 to determine where foreground objects are located, and to build a mask over the foreground objects. Thus, the masking network 202 produces a mask corresponding to locations in the input image 101 of occluding foreground objects. The mask is applied to the input image 101 to generate a masked image.

The masked image, therefore, includes portions of occluded background objects. To infer the objects located in the positions of the mask, an in-painting network 210 receives the masked image as well as the mask itself. Features of the occluded areas are inferred such that contextual information of the masked image into account. For example, a convolutional neural network such as, e.g., ResNet-50, can be used for feature extraction of each of the masked image and the mask. The features from each of the masked image and the mask can be fused together to generate a fused feature map. Similar to above, by extracting features with a single ResNet-50 network, reduces computation complexity and increases efficiency while also facilitating predicting both depth values and semantic features. One or more decoders can then be used to reconstruct the masked image with the masked portion in-painted to complete the extracted features.

In particular, the semantic in-painting network 212 can decode the fused feature map to reconstruct the masked image. However, during decoding, the semantic in-painting network 212 infers features in the occluded or masked areas of the masked image. As such, the semantic in-painting network 212 can include, e.g., a PSP for decoding the fused feature map. The semantic in-painting network 212 can employ bilinear up-sampling to return a same resolution as the input image 101. As a result, the semantic predictions are applied to each pixel to generate an image of background semantic predictions 105 where each pixel includes class probabilities corresponding to background features of the occluded areas.

The depth in-painting network 214 decodes the fused feature map concurrently with the semantic in-painting network 212. The depth in-painting network 214 reconstructs depth features to predict depth values in the occluded or masked areas of the masked image. As such, the depth in-painting network 214 can include, e.g., a fully convolutional residual network to reconstruct the depth values in the occluded areas. The depth in-painting network 214 can employ bilinear up-sampling to return a same resolution as the input image 101. As a result, the depth predictions are applied to each pixel to generate an image of background depth predictions 106 where each pixel includes depth probabilities corresponding to the background features of the occluded areas.

Each of the masking network 202, semantic segmentation network 204 and in-painting network 210 are trained feature and depth recognition. However, access to ground-truth labeled training data can be very costly and impractical. Training can be performed more efficiently and cost effectively, however, by foregoing labeled training data. Rather, the background prediction network 200 can be trained to generate the background semantic predictions 105 and background depth predictions 106 using synthetic masking.

During training, rather than masking foreground features of the input image 101, the masking network 202 uses a synthetic masking network 203 to mask random portions of the background features of the input image 101. The background features in the masked portions are known because the background features of the masked portions are present in the input image.

The synthetic mask and the synthetically masked image are provided to the in-painting network 210 as described above to generate background semantic predictions 105 and background depth predictions 106. The background semantic predictions 105 and the background depth predictions 106 can be compared to the input image 101 and the combined feature map of the input image 101 from the semantic segmentation network 204 to assess reconstruction error. For example, a loss function can be employed, such as, e.g., cross entropy loss, and the error can be backpropagated to the in-painting network 210 using, e.g., gradient descent.

Thus, the in-painting network 210 is quickly and efficiently trained without the need for external, financially and computationally expensive training data. In fact, training can be performed continuously because the synthetic masking network 203 can synthetically mask non-occluded background features of the input image 101 while the masking network 202 masks the foreground features. As a result, computation is reduced while increasing accuracy.

Figure 4:
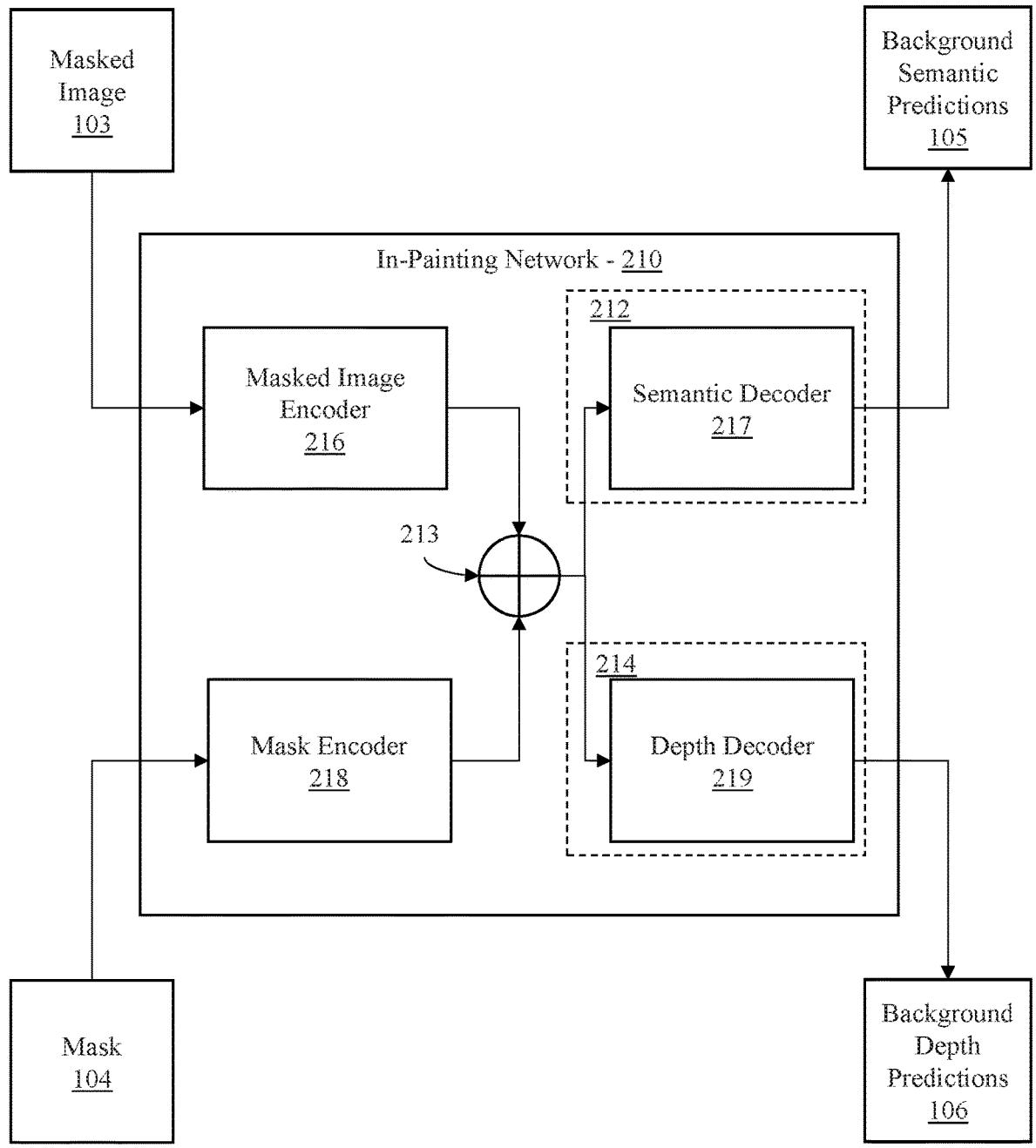
FIG. 4 is a block/flow diagram illustrating a network for in-painting occluded portions of background objects, in accordance with the present principles.

Referring now to FIG. 4, a network for in-painting occluded portions of background objects is depicted according to an embodiment of the present invention.

According to an embodiment of present invention, the in-painting network 210 can include two encoders and two decoders to facilitate accurate and efficient prediction of background semantics and background depths. Thus, one possible embodiment of the in-painting network 210 can include, e.g., a masked image encoder 216 and mask encoder 218, as well as a semantic decoder 217 and a depth decoder 219. As such, a feature map can be formed by encoding with the masked image encoder 216 and the mask encoder 218 and concatenating the outputs into one feature map, and then decoding with the two separate decoders to generate background semantic predictions 105 and background depth predictions 106.

In particular, a masked image 103 and a mask 104 used to form the masked image 103 are provided to the in-painting network 210 to in-paint features into the masked areas of the masked image 103. While the in-painting network 210 can in-paint features using only the masked image 103, the mask 104 can improve the in-painting. The mask 104 prevents training confusion of the in-painting network 210 because a mean RGB value of the masked image 103, when normalized, is 0 and may share a value with other pixels. Moreover, the mask 104 can facilitate encoding more information, such as the category of the occluded or masked pixels.

To utilize both the masked image 103 and the mask 104, the masked image 103 and the mask are separately encoded. Thus, the masked image 103 can be encoded with a masked image encoder 216 to generate a feature map for corresponding to extracted features of the masked image 103. Therefore, the masked image encoder 216 can include an encoder for semantic feature extraction, such as, e.g., convolutional neural network (CNN) such as ResNet-50, among other neural networks. As a result, the masked image encoder 216 can extract semantic features from the masked image 103 and encode the features as a masked image feature map.

Additionally, the mask 104 can be encoded with a mask encoder 218 concurrently with encoding the masked image 103 at the masked image encoder 216. The mask encoder 218 extracts features from the mask alone. The mask 104 has less data and is used to prevent training confusion, and thus the mask encoder 218 need not be as deep as the masked image encoder 216. Accordingly, the mask encoder 218 can include, e.g., a neural network for extracting semantic features, such as, e.g., a shallow CNN that is relatively shallower than the network implemented with the masked image encoder 216. Thus, the mask encoder 218 generates a mask feature map including features extracted from the mask 104.

To use the features extracted from the mask 104 to refine the features extracted from the masked image 103, the masked image feature map and the mask feature map can be concatenated to combine information from both sets of features into a single feature map. To combine the feature maps, a feature map fuser 213 can be included to fuse the masked image feature map with the mask feature map. As a result, a single fused feature map is generated that can be used to identify both semantic features in the masked image 103 as well as depth features in the masked image 103.

To predict semantic features, a semantic decoder 217 is included in the semantic in-painting network 212 of the in-painting network 210. The semantic decoder 217 decodes the fused feature map to reconstruct an image by predicting semantic features including object classes at each pixel of the reconstructed image. As a result, the semantic decoder 217 can predict object classes corresponding to the original background objects visible in the masked image 103, but also occluded background objects not visible behind the masked areas of the masked image 103. Thus, in the decoding process, the masked areas are in-painted according to the semantic segmentation. As a result, the semantic decoder 217 utilizes the context provided in the fused feature map to infer occluded areas of the masked image 103. As a result, the semantic decoder 217 can include a decoder suitable for decoding semantic features including object classes to generate object class predictions. For example, the semantic decoder 217 can include, e.g., a PSP, among other decoders. The semantic decoder 217, therefore, generates background semantic predictions 105 that include background object class probabilities at each pixel of an image, including both visible and occluded background objects of the masked image 103.

Similarly, to predict depth features, a depth decoder 219 is included in the depth in-painting network 214 of the in-painting network 210. The depth decoder 219 decodes the fused feature map to reconstruct an image by predicting depth probabilities at each pixel of the reconstructed image. As a result, the depth decoder 219 can predict depth values corresponding to the original depth values of background objects visible in the masked image 103, but also depth values for occluded background objects not visible behind the masked areas of the masked image 103. Thus, in the decoding process, the masked areas are in-painted according to the depth prediction. As a result, the depth decoder 219 utilizes the context provided in the fused feature map to infer occluded areas of the masked image 103. As a result, the depth decoder 219 can include a decoder suitable for decoding depth values of objects to generate depth value predictions. For example, the depth decoder 219 can include, e.g., a decoder corresponding to a fully convolutional residual network, among other decoders. The depth decoder 219, therefore, generates background depth predictions 106 that include background object depth probabilities at each pixel of an image, including both visible and occluded background objects of the masked image 103.

Figure 5:
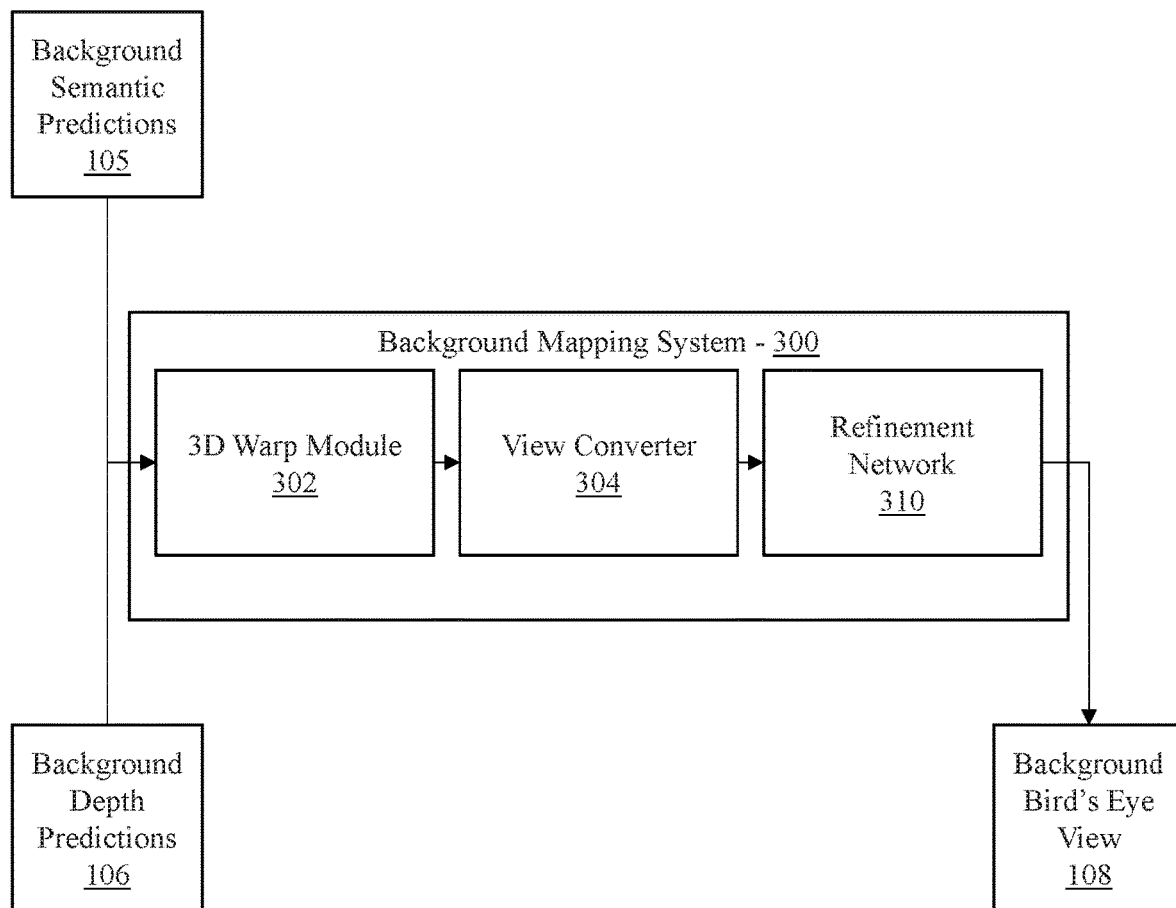
FIG. 5 is a block/flow diagram illustrating a network for mapping background objects to a bird's eye view representation, in accordance with the present principles.

Referring now to FIG. 5, a network for mapping background objects to a bird's eye view representation is depicted according to an embodiment of the present invention.

The background semantic predictions 105 and the background depth predictions 106 provide information regarding objects and positions for each pixel of an image. Thus, the combination of the background semantic predictions 105 and the background depth predictions 106 can be used to establish locations of each object in the environment, and therefore map the objects to a background bird's eye view map 108 using a background mapping system 300.

According to an aspect of the present embodiment, the background mapping system 300 can combine the background semantic predictions 105 and the background depth predictions 106, and use the combination to determine coordinates for each background object. Thus, the background mapping system 300 can include a 3D warp network 302. The 3D warp network 302 apply the background depth predictions 106 to the background semantic predictions 105 by matching pixel-by-pixel depth values to object class predictions. As a result, each object in the background semantic predictions 105 can be given depth information. The depth information combined with the pixel location can be used to generate a depth map of background objects including three dimensions, e.g., the two dimensions of the image of background semantic predictions 105 and a third dimension including depths. The 3D warp network 302 can use the depth map to generate a 3D point cloud including each pixel as a point in the 3D point cloud.

The 3D point cloud can be in a coordinate system corresponding to a view of the original input image 101. However, the view of the original input image 101 may not have a component that directly corresponds to a top-down view. As a result, the 3D point cloud can be converted to be represented in coordinates with an elevation component relative to a ground plane of the environment, rather than relative to a view of the input image 101. Thus, a view converter 304 can convert the 3D point cloud to a coordinate system based in, e.g., a Cartesian coordinate system, or other suitable coordinate system, with a z-axis corresponding to distance from a ground plane, such as, e.g., height or elevation. Axes parallel to a ground plane of the environment, e.g., an x-axis and a y-axis, can be applied to the 3D point cloud with each point being assigned an x and a y coordinate to the nearest integer. As a result, the x and y coordinates represent locations of each point in the 3D point cloud on the ground of the environment. As a result, the view converter 304 drops the z-axis from the points of the point cloud to generate a 2D representation that constitutes an initial bird's eye view of the background objects of the environment.

While the view converter 304 generates an initial bird's eye view of the background objects, the view may include imperfections. For example, some pixels may not have been assigned a class probability, or there may have been imperfect depth predictions resulting in incorrect placement of objects within the initial bird's eye view. As a result, according to aspects of the present invention, the background mapping system 300 can include a refinement network 310 to refine the initial bird's eye view generated by the view converter 304, and generate a final background bird's eye view 108 that maps the background objects in a bird's eye view.

The refinement network 310 can refine the initial bird's eye view generated by the view converter 304 using a trained refinement network including, e.g., a CNN trained to correct imperfects in the background objects of the initial bird's eye view. In one possible embodiment, the refinement network 310 includes, e.g., a CNN with an encoder-decoder structure and a fully-connected bottleneck layer.

The refinement network 310 uses known or verifiable information of the background features to adjust pixel values in the initial bird's eye view, such as, e.g., road shapes and road features, road and landscape locations, among other information. This known or verifiable information can be leveraged by encoding the initial bird's eye view into a lower spatial resolution and decoding the encoded initial bird's eye view back to an original resolution. The encoder and the decoder can include parameters trained to return the initial bird's eye view back to full resolution with objects refined with the known or verifiable information. For example, the refinement network 310 can be augmented with a corresponding red-green-blue (RGB) image of objects and/or aerial views of the environment. Thus, imperfections are removed, and objects are refined to more accurately portray the actual environment.

Figure 6:
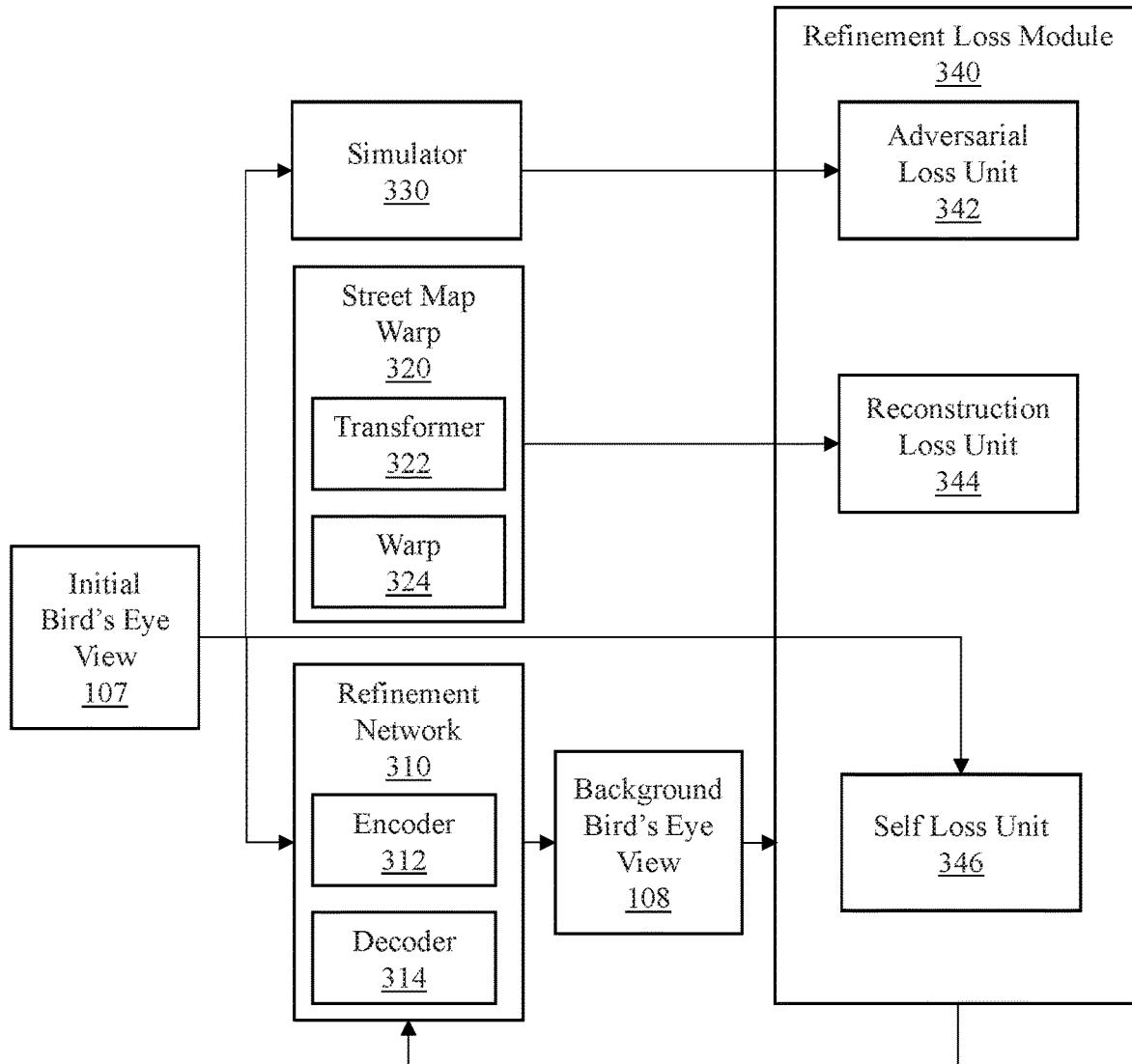
FIG. 6 is a block/flow diagram illustrating a system/method for training a refinement module for refining a bird's eye view representation, in accordance with the present principles.

Referring now to FIG. 6, a system/method for training a refinement module for refining a bird's eye view representation is depicted according to an embodiment of the present invention.

The refinement network 310 can be trained to remove imperfections from an initial bird's eye view 107 using known or verifiable information. As described above, the refinement network can include, e.g., an encoder 312 and a decoder 314. The encoder 312 encodes the initial bird's eye view 107 to a lower resolution. The decoder 314 decodes the lower resolution encoded initial bird's eye view back to the original resolution of the initial bird's eye view 107 to generate a final background bird's eye view 108. The encoder 312, therefore, encodes the features of the initial bird's eye view 107 according to encoder parameters. The decoder 314 reproduces the encoded features into a full image according to decoder parameters to generate the final background bird's eye view 108.

To train the encoder parameters and the decoder parameters, a refinement loss module 340 incorporates information from one or more of, e.g., a simulator 330 and a street map warp 320 via an adversarial loss unit 342 and a reconstruction loss unit 344, respectively. The adversarial loss unit 342 and the reconstruction loss unite 344 can calculate error between the output of the simulator 330 and street map warp 320, respectively, and the background bird's eye view 108 provided to the refinement loss module 340. The refinement loss module 340 uses loss determined by the adversarial loss unit 342 and the reconstruction loss unit 344 to provide weight updates to the refinement network 310. The refinement loss module 340 can also include a self-loss unit 346 to determine loss between known features in the initial bird's eye view 107 and the background bird's eye view 108.

In particular, the simulator 330 can include a trained network for modeling typical driving scene features. For example, the simulator 330 can be trained to model road features, such as, e.g., intersections, lanes, curves, sidewalks, and other features. Because the simulator 330 is being used to refine placement and shape of objects in the initial bird's eye view 107, precise models are not necessary. For example, textures, occlusions and perspective distortions are not a concern. Thus, the simulator 330 can be a simple and efficient simulator for predicting general shape of road features in the initial bird's eye view 107.

The simulated features from the simulator 330 are provided to the adversarial loss unit 342 of the refinement loss module 340. The adversarial loss unit 342 calculates an error between the simulated features and the background bird's eye view 108. The simulated features constitute known features and thus take the place of ground-truth training data. Thus, the adversarial loss unit 342 uses the simulated features to discriminate between the simulated features and the background bird's eye view 108 using, e.g., a discriminator. The adversarial loss unit 342 can, therefore, use a loss function such as the function of Equation 1 below:

$$\mathcal{L}^{adv} = \Sigma_{i=1}^m d(\mathcal{B}_i^{final};\theta) - \Sigma_{i=1}^m d(B_i^{sim};\theta); \quad (1)$$

where $\mathcal{L}^{adv}$ as the adversarial loss, i is an index corresponding to a batch of feature predictions, m is the batch size, d is the discriminator function, θ are discriminator parameters, $B^{final}$ are the features from the background bird's eye view 108, and $B^{sim}$ are the simulated features from the simulator 330, θ are discriminator parameters. According to aspects of the present invention, the discriminator can include, e.g., a generative adversarial network (GAN) such as, e.g., a Wasserstein GAN (WGAN). The discriminator function can include, e.g., a K-Lipschitz function such that the discriminator can be enforced by gradient clipping on the parameters θ during training.

Therefore, the error calculated by the adversarial loss unit 342 can be used to correct the representation of corresponding features in the background bird's eye view 108. Thus, the refinement loss module 340 returns the error from the adversarial loss unit 342 to the refinement network 310 to update the encoder parameters and decoder parameters using, e.g., gradient descent, among other backpropagation techniques.

However, to reduce the risk of excessive deviation from the initial bird's eye view 107 due to the adversarial loss, the loss can be regularized. Thus, reconstruction loss from the self-loss unit 346 can be included to improve the loss estimate. For example, self-loss can be determined according to Equation 2 below:

$$\mathcal{L}^{self} = \frac{\|(\mathcal{B}^{init} - \mathcal{B}^{final}) \odot M\|^2}{\Sigma_{ij} M}; \quad \text{Equation 2}$$

where $\mathcal{L}^{self}$ is the self-loss, $B^{init}$ is the initial bird's eye view 107, M is the mask including 0 for unobserved pixels in the initial bird's eye view 107 and 1 for observed pixels in the initial bird's eye view 107, j is the column index for the matrix of mask M, and ⊙ indicates the element-wise multiplication of M.

Self-loss and adversarial loss can be provided to the refinement network 310 either individual or together to update the encoder parameters and decoder parameters. To provide the self-loss and adversarial loss in combination, a simulator loss can be determined by adding the self-loss to the adversarial loss. The simulator loss can be backpropagated to the refinement network 310 via, e.g., gradient descent.

Additionally, or alternatively, the refinement loss module 340 can incorporate loss from street map warp 314 information. In particular, the street map warp 320 can provide an aerial view of the actual environment captured in the original image and the background bird's eye view 108. For example, the street map warp 320 can provide an aerial view including, e.g., a map from OpenStreet Maps, or other mapping service.

However, the aerial view may not be aligned with the background bird's eye view 108, thus providing an imperfect comparison between the images. Accordingly, the street map warp 320 warps the aerial view to align with the location and angle of the background bird's eye view 108. For example, the street map warp 320 can use, e.g., global positioning system (GPS) measurements provided with the original image, as well as angle of perspective, to determine location and angle of the background bird's eye view 108. The street map warp 320 can use the location and angle to rotate, translate, crop and zoom the aerial view to match the background bird's eye view 108.

However, GPS signals may contain noise or inaccuracies, and angle estimates may be imperfect due to annotation noise and missing information. Therefore, the street map warp 320 can, alternatively, align the aerial view to the background bird's eye view 108 by matching semantics and geometry. For example, the street map warp 320 can include, e.g., a parametric spatial transformer 322 and a non-parametric warp 324.

The transformer 322 can determine translation, rotation and scale of the aerial view according to the initial bird's eye view 107 and a warping function. The warping function takes into account warping parameters and the aerial view to determine an appropriate transformation to align the aerial view. Accordingly, the warping function include a function such as, e.g., Equation 3 below:

$$\mathcal{B}^{aerial} = w(B^{aerial};\theta) \quad (3)$$

where $B^{aerial}$ is the aerial view, w is the warping fuction, and θ are the warping parameters.

To train the warping parameters, the reconstruction can be minimized with regards to the initial bird's eye view 107. Therefore, warping can be iterated through minimization of the reconstruction with the warping parameters according to a function, such as, e.g., Equation 4 below:

$$\theta = \operatorname*{argmax}_{\theta} \frac{\|(\mathcal{B}^{init} - w(\mathcal{B}^{aerial};\theta)) \odot M\|^2}{\Sigma_{ij} M}; \quad \text{Equation 4}$$

Once the warping parameters are minimized, and a final warp of the aerial view is obtained, loss can be determined between the features of the aerial view and the features of the background bird's eye view 108. Loss can be, e.g., a reconstruction loss performed by the reconstruction loss unit 344. For example, loss can be determined according to Equation 5 below:

$$\mathcal{L}^{rec} = _{\mu}|B^{final} - B^{aerial}|_{\mu}^{2}; \quad (5)$$

where $\mathcal{L}^{rec}$ is the reconstruction loss. The reconstruction loss can be returned to the refinement network 310 by the refinement loss module 340 using, e.g., backpropagation by gradient descent, or other suitable backpropagation technique. As a result, the encoder parameters and decoder parameters are updated according to known information included in the actual aerial views of the street map warp 320.

Accordingly, the refinement network 310 can be trained to quickly and efficiently reduce imperfections in the initial bird's eye view 107 using training by known or verifiable information. As a result, the background bird's eye view 108 accurately maps the background objects to the environment.

Figure 7:
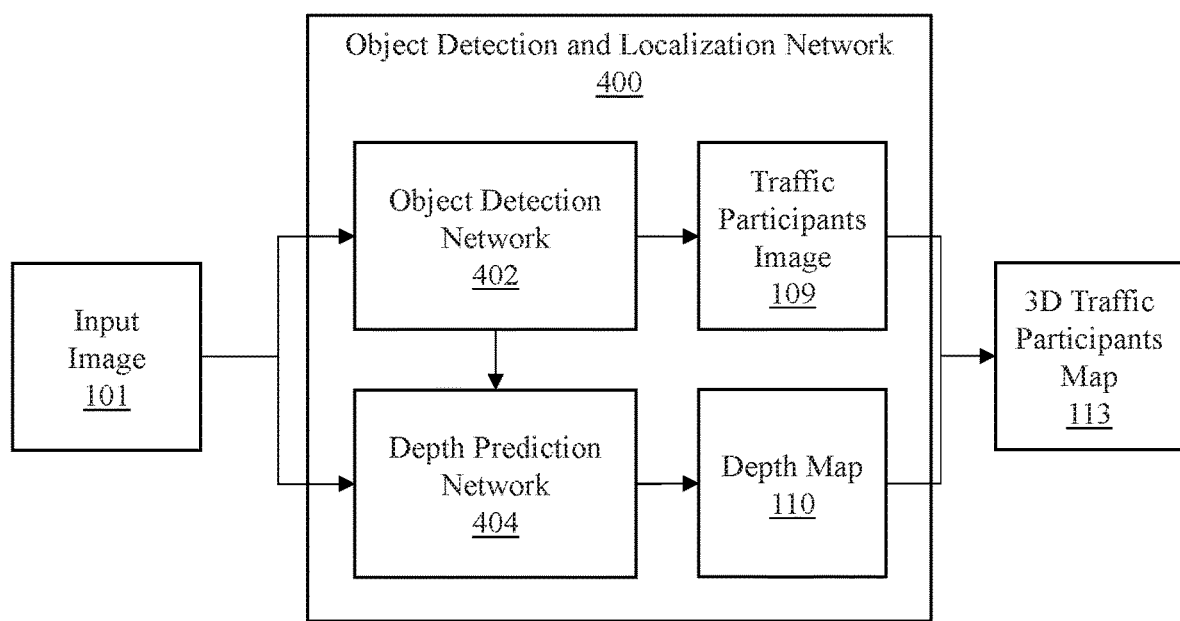
FIG. 7 is a block/flow diagram illustrating a system/method for detecting and localizing foreground objects in three-dimensional (3D) space, in accordance with the present principles.

Referring now to FIG. 7, a system/method for detecting and localizing foreground objects in three-dimensional (3D) space is depicted according to an embodiment of the present invention.

The object detection and localization network 400 generates a traffic participants image 109 and a depth map 110 from the input image 101. To do so, according to aspects of an embodiment of the present invention, the object detection and localization network 400 includes an object detection network 402 and a depth prediction network 404.

The object detection network 402 recognizes foreground objects, such as, e.g., vehicles, people, cyclists, animals, vegetation, etc. To recognize the foreground objects, the object detection network 402 can utilize semantic segmentation to extract features corresponding to the foreground objects. Thus, the object detection network 402 can include, e.g., a CNN, such as, e.g., a CNN including PSP. Thus, the object detection network 402 extracts the features corresponding to the foreground object and generates an image of the foreground objects to produce the traffic participants image 109.

The object detection network 402 can be trained to recognize foreground objects by training the object detection network 402 against training images of the foreground objects. Using reconstruction loss, the object detection network 402 can have parameters updated to more accurately recognize the foreground objects.

The depth prediction network 404 can use the input image 101 to generate the depth map 110 for the foreground objects identified by the object detection network 402. To determine depths, the depth prediction network 404 encodes the input image with, e.g., a CNN to extract features from the input image 101. The extract features can then be decoded with a decoder, e.g., from a fully convolutional residual network for single image depth prediction. As a result, the depth prediction network 404 generates depth predictions at each pixel of the input image 101. The depth predictions form a depth map 110 of corresponding to the input image 110.

As described with reference to FIG. 2 above, the traffic participants image 109 can be combined with depth map 110 to determine locations of the foreground objects identified in the traffic participants image 109 within a 3D representation. The 3D representation can include, e.g., a 3D point cloud, or other representation to map the foreground objects using the location within the traffic participants image 109 and the depths from the depth map 110. As a result, a 3D traffic participants map 113 can be generated that localizes the foreground objects with reference to the view of the input image 101.

Figure 8:
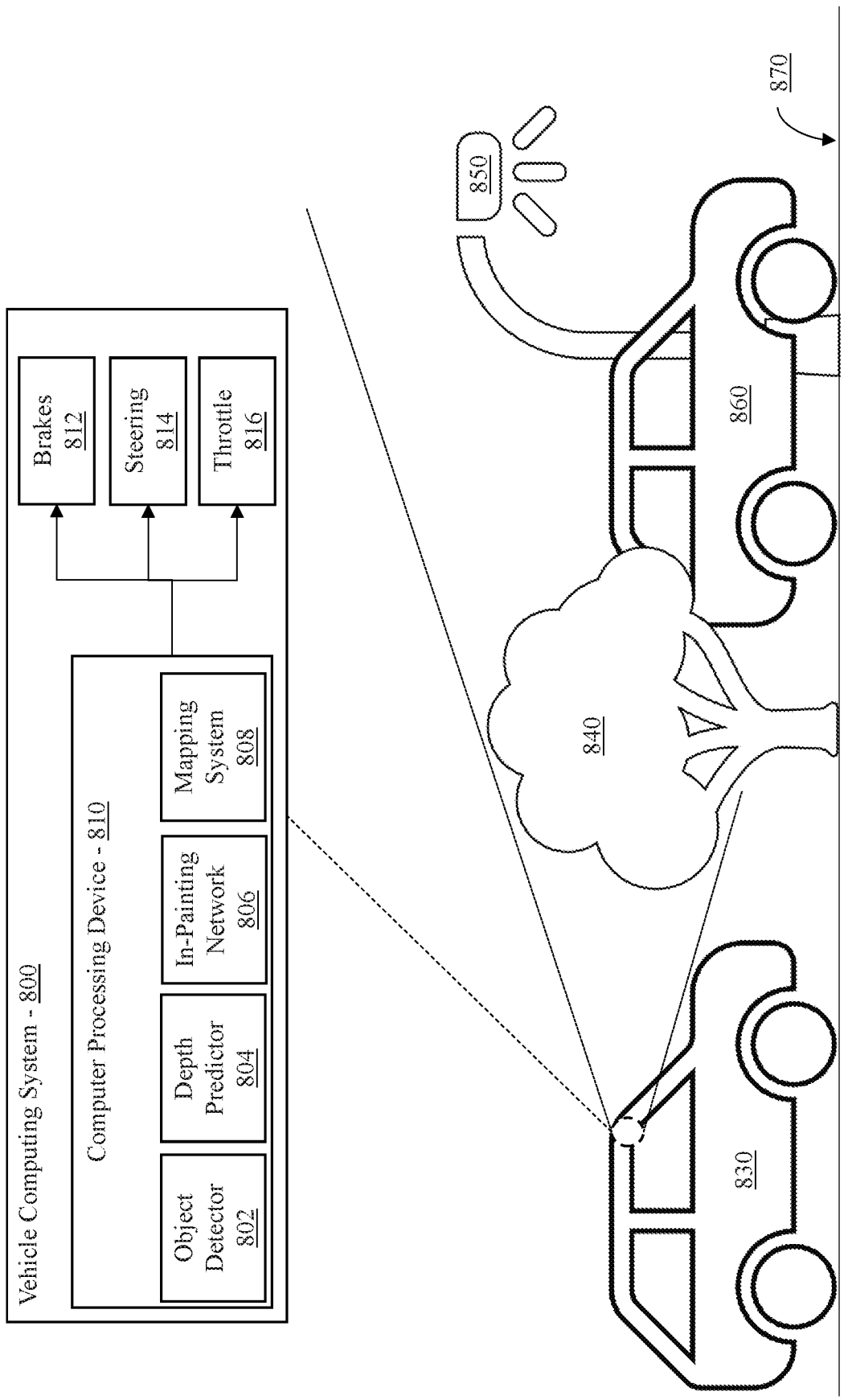
FIG. 8 is a diagram illustrating a high-level system/method for generating occlusion-aware bird eye view representations for autonomous navigation of a complex road scene, in accordance with the present principles.

Referring now to FIG. 8, a high-level system/method for generating occlusion-aware bird eye view representations for autonomous navigation of a complex road scene is depicted according to an embodiment of the present invention.

According to aspects of the present invention, an embodiment can include an autonomous vehicle 830 with a device to capturing images with a perspective view of a complex environment, such as, e.g., a complex road scene. The road scene can include a variety of foreground objects, such as, e.g., a tree 840, a vehicle 860, a street lamp 850, among others, including traffic signs, pedestrians, cyclists, animals, vegetation, etc. The road scene can also include background objects, such as, e.g., a road 870, among others including, e.g., landscape features, buildings, etc.

An image from the image capture device 830 can be analyzed by a computing system 800 to provide a historical or real-time bird's eye view map of the road scene to a user. To provide such a map, the computer system 800 receives the perspective view image and infers objects occluded by the foreground objects. By inferring the occluded objects, the computing system 800 can localize both foreground and background objects with a high degree of fidelity.

Accordingly, at least one embodiment of the computing system 800 includes a computer processing device 800 with an object detector 802. The object detector 802 access the image and detects foreground objects such as, e.g., the tree, 840, the car 860 and the street lamp 850. To detect the foreground objects, the object detector 802 includes a neural network, such as, e.g., a convolutional neural network or pyramid scene parsing (PSP) network, that performs semantic segmentation on the image.

Concurrently with the object detector 802, a depth predictor 804 included with the computer processing device 810 determines depth measurements for each foreground object. To determine the depth measurements, the depth predictor 804 can establish a depth map according to, e.g., a stereoscopic image, a neural network for predicting depths such as, e.g., a fully convolutional residual network, or other depth determination technique. The depth map can be applied to the foreground objects extracted by the object detector 802 to determine 3D dimensional coordinates for each foreground object.

The computer processing device 810 can also include an in-painting network 806 for identifying background objects and inferring portions of the background objects occluded by the foreground objects. According to aspects of the present invention, the in-painting network 806 can recognize background objects using, e.g., a convolutional neural network, PSP, or other semantic segmentation technique to extract features corresponding to the background objects. However, foreground objects may occlude portions of the background objects from the perspective of the image capture device 830. To identify objects behind the occluding foreground objects, the in-painting network 806 can, e.g., mask the foreground objects from the image. Using the remaining image including the background objects, the masked portions can be replaced with inferences as to objects behind the occluding foreground objects. Thus, the in-painting network 806 can reason the shape of the recognized background objects using contextual information to infer the occluded portions and in-paint into the masked portions of the image. In-painting can include both assigning class probabilities to each pixel corresponding to background objects, as well as assigning depth value predictions. Thus, the in-painting network 806 completes the masked image by filling in the masked portions of the image with appropriate background objects.

Because the in-painting network 806 establishes both features and depth values, similar to the depth predictor 804, a mapping system 808 can establish coordinates for each background object to localize the background objects in 3D space, such as, e.g., by generating a 3D point cloud. The 3D point cloud can be converted to a bird's eye view by eliminating an elevation component form the 3D point cloud, projecting the points onto a horizontal plane. Thus, a 2D, top-down map of the background objects is created.

Aspects of the present invention include refining the bird's eye view generated by the mapping system 808 leveraging, e.g., street maps such as, e.g., OpenStreet Map data, or by simulating road shapes, among other refining techniques to ensure that road locations and shapes are correct within the bird's eye view.

The computer processing device 810 can combine the bird's eye view of the foreground objects with the bird's eye view of the background object to generate a final bird's eye view of the complex road scene. The computer processing device 810 uses the bird's eye view to navigate the road scene with an awareness of objects present behind the foreground objects. As a result, the autonomous vehicle 830 can navigate more effectively and more safely by employing a more accurate map of the road scene in decision making. Thus, the computer processing device 810 can control, e.g., brakes 812, steering 814 and throttle 816, among other vehicle controls, to make proactive navigation decisions in response to the road scene, such as turning or braking in response to, e.g., turns in the road 870, intersections, vehicles, and other situational navigation.

Figure 9:
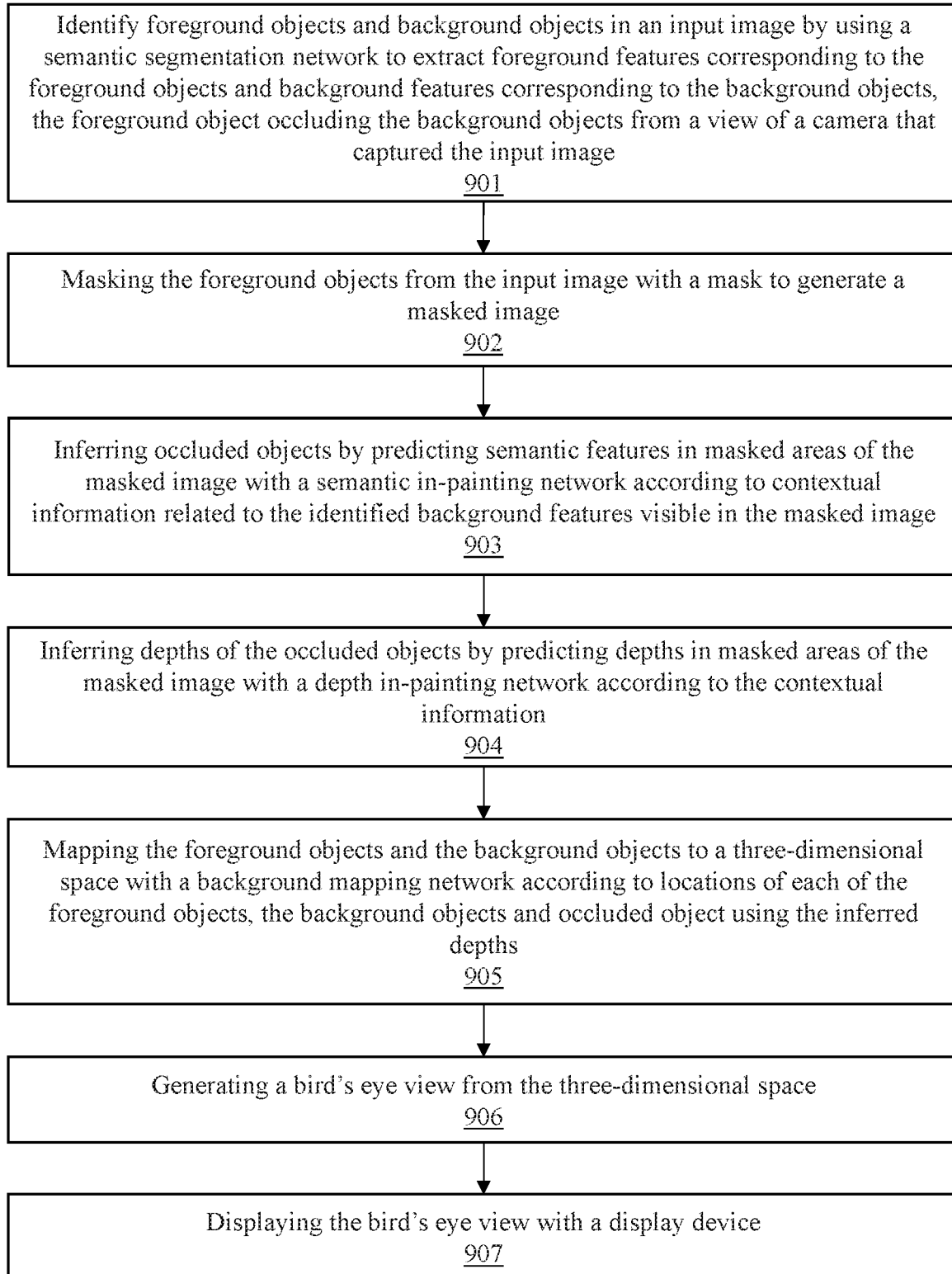
FIG. 9 is a block/flow diagram illustrating a system/method for generating occlusion-aware bird eye view representations of a complex road scene, in accordance with the present principles.

Referring now to FIG. 9, a system/method for generating occlusion-aware bird eye view representations of a complex road scene is depicted according to an embodiment of the present invention.

At block 901, identifying foreground objects and background objects in an input image by using a semantic segmentation network to extract foreground features corresponding to the foreground objects and background features corresponding to the background objects, the foreground object occluding the background objects from a view of a camera that captured the input image.

At block 902, masking the foreground objects from the input image with a mask to generate a masked image.

At block 903, inferring occluded objects by predicting semantic features in masked areas of the masked image with a semantic in-painting network according to contextual information related to the identified background features visible in the masked image.

At block 904, inferring depths of the occluded objects by predicting depths in masked areas of the masked image with a depth in-painting network according to the contextual information.

At block 905, mapping the foreground objects and the background objects to a three-dimensional space with a background mapping system according to locations of each of the foreground objects, the background objects and occluded object using the inferred depths.

At block 906, generating a bird's eye view from the three-dimensional space.

At block 907, displaying the bird's eye view with a display device.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for generating an occlusion-aware bird's eye view map of a road scene, the method comprising:
   identifying foreground objects and background objects in an input image by using a semantic segmentation network to extract foreground features corresponding to the foreground objects and background features corresponding to the background objects;
   masking the foreground objects from the input image with a mask to generate a masked image;
   inferring occluded objects by predicting semantic features in masked areas of the masked image with a semantic in-painting network according to contextual information related to the identified background features visible in the masked image;
   inferring depths of the occluded objects by predicting depths in masked areas of the masked image with a depth in-painting network according to the contextual information;
   mapping the foreground objects and the background objects to a three-dimensional space with a background mapping system according to locations of each of the foreground objects, the background objects and occluded objects using the inferred depths;
   identifying the foreground objects and the background objects by joint feature extraction with an encoder to produce a joint feature map;
   generating a bird's eye view from the three-dimensional space; and
   displaying the bird's eye view with a display device.

2. The method as recited by claim 1, further including:
   predicting depth probabilities for each pixel of the input image by decoding the joint feature map with a depth decoder; and
   predicting class probabilities corresponding to the foreground objects and the background objects for each pixel of the input image by decoding the joint feature map with a semantic decoder.

3. The method as recited by claim 1, further including inferring the occluded objects by:
   encoding the masked image with a masked image encoder to produce a masked image feature map:
   encoding the mask with a mask encoder to produce a mask feature map;
   fusing the masked image feature map with the mask feature map to produce a fused feature map; and
   decoding the fused feature map with a semantic decoder to predict class probabilities for each pixel of the masked areas corresponding to the occluded objects.

4. The method as recited by claim 3, further including inferring the depths by decoding the fused feature map with a depth decoder to predict depth probabilities for each pixel of the masked areas corresponding to the occluded objects.

5. The method as recited in claim 1, further including mapping the three-dimensional space to a two-dimensional space corresponding to the bird's eye view with a view converter, including:
assigning three coordinate values corresponding to three coordinate axes to each point in the three-dimensional space, one of the coordinate axes including a z coordinate perpendicular to a ground plane of the road scene; and
removing the z coordinate from the three coordinate values of each of the points to reduce the three-dimensional space to the two-dimensional space corresponding to a bird's eye view of the road scene.

6. The method as recited in claim 1, further including refining the bird's eye view with a refinement network, including:
encoding the bird's eye view with an encoder to generate a bird's eye view feature map; and
decoding the bird's eye view feature map with a decoder to generate a refined bird's eye view.

7. The method as recited in claim 6, further including training the refinement network, including:
simulating background object shapes by modeling the background objects of the bird's eye view with a simulator; and
determining an adversarial error between the background object shapes and shapes of the background objects corresponding to roads with an adversarial loss unit.

8. The method as recited in claim 7, further including modifying the adversarial error, including:
determining a self-reconstruction error by comparing the refined bird's eye view to the bird's eye view with a self-loss unit; and
combining the self-reconstruction error and the adversarial error.

9. The method as recited in claim 6, further including training the refinement network, including:
warping a semantic aerial image of the road scene to align with the bird's eye view to produce a warped aerial image; and
determining a reconstruction loss between the warped aerial image and the refined bird's eye view with a reconstruction loss unit.

10. A computer processing system for generating an occlusion-aware bird's eye view map of a road scene, the system comprising:
a semantic segmentation network that identifies foreground objects and background objects in an input image by extracting foreground features corresponding to the foreground objects and background features corresponding to the background objects, the foreground object occluding the background objects from a view of a camera that captured the input image;
a masking network that masks the foreground objects from the input image with a mask to generate a masked image;
a semantic in-painting network that infers occluded objects by predicting semantic features in masked areas of the masked image according to contextual information related to the identified background features visible in the masked image;
a depth in-painting network that infers depths of the occluded objects by predicting depths in masked areas of the masked image according to the contextual information;
a background mapping system that maps the foreground objects and the background objects to a three-dimensional space according to locations of each of the foreground objects, the background objects and occluded object using the inferred depths;
an encoder to identify the foreground objects and the background objects by joint feature extraction to produce a joint feature map;
a view converter that generates a bird's eye view from the three-dimensional space; and
a display device that displays the bird's eye view.

11. The computer processing system as recited by claim 10, further including:
a depth decoder that predicts depth probabilities for each pixel of the input image by decoding the joint feature map; and
a semantic decoder that predicts predict class probabilities corresponding to the foreground objects and the background objects for each pixel of the input image by decoding the joint feature map.

12. The computer processing system as recited by claim 10, further including an in-painting network that infers the occluded object, including:
a masking image encoder that encodes the masked image to produce a masked image feature map:
a mask encoder that encodes the mask to produce a mask feature map;
a fuser that fuses the masked image feature map with the mask feature map to produce a fused feature map; and
a semantic decoder that decodes the fused feature map to predict class probabilities for each pixel of the masked areas corresponding to the occluded objects.

13. The computer processing system as recited by claim 12, further including a depth decoder that infers the depths by decoding the fused feature map to predict depth probabilities for each pixel of the masked areas corresponding to the occluded objects.

14. The computer processing system as recited in claim 10, further including a view converter that maps the three-dimensional space to a two-dimensional space corresponding to the bird's eye view, including:
assigning three coordinate values corresponding to three coordinate axes to each point in the three-dimensional space, one of the coordinate axes including a z coordinate perpendicular to a ground plane of the road scene; and
removing the z coordinate from the three coordinate values of each of the points to reduce the three-dimensional space to the two-dimensional space corresponding to a bird's eye view of the road scene.

15. The computer processing system as recited in claim 10, further including a refinement network that refines the bird's eye view, including:
a refinement encoder that encodes the bird's eye view to generate a bird's eye view feature map; and
a refinement decoder that decodes the bird's eye view feature map to generate a refined bird's eye view.

16. The computer processing system as recited in claim 15, further including a refinement loss module that trains the refinement network, including:
a simulator that simulates background object shapes by modeling the background objects of the bird's eye view; and
an adversarial loss unit that determines an adversarial error between the background object shapes and shapes of the background objects corresponding to roads.

17. The computer processing system as recited in claim 16, further including a self-loss unit that modifies the adversarial error, including:
- determining a self-reconstruction error by comparing the refined bird's eye view to the bird's eye view with a self-loss unit; and
- combining the self-reconstruction error and the adversarial error.

18. The computer processing system as recited in claim 15, further including a refinement loss module that trains the refinement network, including:
- a street map warp transformer that warps a semantic aerial image of the road scene to align with the bird's eye view to produce a warped aerial image; and
- a reconstruction loss unit that determines a reconstruction loss between the warped aerial image and the refined bird's eye view.

\* \* \* \* \*